United States Patent [19]
Harris et al.

[11] Patent Number: 5,762,424
[45] Date of Patent: Jun. 9, 1998

[54] FULL PERIMETER FIBER WOUND BEARING CONSTRUCTION

[75] Inventors: Bernard Harris, Northbrook; Dennis E. Bozych, Downers Grove; Jeffrey R. Scholbe, Lisle, all of Ill.

[73] Assignee: Rexnord Corporation, Milwaukee, Wis.

[21] Appl. No.: 725,358

[22] Filed: Oct. 3, 1996

[51] Int. Cl.$^6$ .................................................. F16C 23/04
[52] U.S. Cl. ........................... 384/299; 384/206; 384/280; 384/298
[58] Field of Search ................................. 384/297, 298, 384/299, 300, 908, 907, 911, 909, 192, 206, 213, 222, 276, 282, 280

[56] References Cited

U.S. PATENT DOCUMENTS

| | | | |
|---|---|---|---|
| 3,070,408 | 12/1962 | Reuter | 384/300 |
| 3,072,448 | 1/1963 | Melton et al. | 384/280 |
| 3,355,200 | 11/1967 | Storch | 284/299 X |
| 3,502,380 | 3/1970 | Adinoff | 384/299 |
| 3,616,000 | 10/1971 | Butzow | 156/86 X |
| 3,700,295 | 10/1972 | Butzow et al. | |
| 3,974,009 | 8/1976 | Butzow et al. | 156/84 |
| 4,681,215 | 7/1987 | Martin | 384/222 X |
| 5,265,965 | 11/1993 | Harris et al. | 384/208 |
| 5,288,354 | 2/1994 | Harris et al. | 156/154 |

*Primary Examiner*—Thomas R. Hannon
*Attorney, Agent, or Firm*—Michael, Best & Friedrich

[57] ABSTRACT

Disclosed herein is a bearing assembly comprising an outer stationary assembly including a housing including an axial bore with an inwardly facing spherical surface, and an outer bearing member including an outwardly facing spherical surface received by the inwardly facing spherical surface of the housing, and a bore including an inwardly facing cylindrical bearing surface, and an inner rotating assembly including a rotating shaft, and a bearing sleeve fixed to the shaft for common rotation and including an axial bore receiving the shaft, and an outwardly facing composite fabric bearing having an outwardly facing cylindrical self-lubricating bearing surface received in the inwardly facing bearing surface of the outer bearing member.

9 Claims, 1 Drawing Sheet

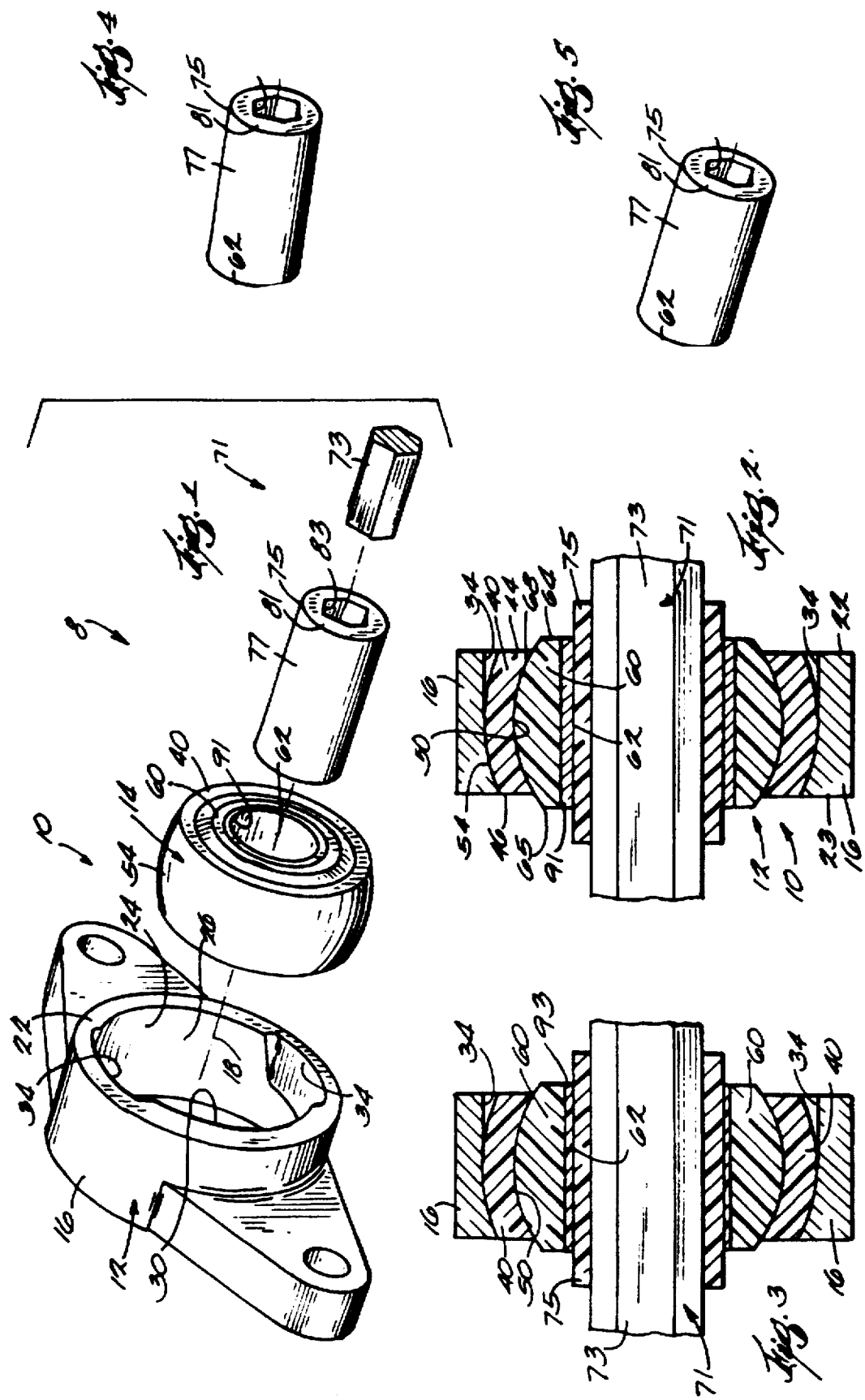

FULL PERIMETER FIBER WOUND BEARING CONSTRUCTION

BACKGROUND OF THE INVENTION

This invention relates generally to composite journal bearings, and, more particularly, to an improved composite ball and socket journal bearing assembly.

Prior designs for journal bearings include location of a self-lubricating bearing surface on the inside diameter of a stationary member which houses the rotating shaft. The rotating shaft engages or contacts up to about 240 degrees of the self-lubricating bearing surface, causing the load on the bearing surface to be concentrated, thereby resulting in shortening of the useful life of the bearing.

Attention is directed to prior U.S. Pat. No. 5,265,965, issued Nov. 30, 1993, which is incorporated herein by reference. Attention is also directed to U.S. Pat. No. 3,700,295, issued Oct. 24, 1972, and U.S. Pat. No. 3,974,009, issued Aug. 10, 1976. Attention is further directed to U.S. Pat. No. 5,288,354 issued Feb. 22, 1994, and incorporated herein by reference.

SUMMARY OF THE INVENTION

The invention provides a bearing assembly comprising an outer non-rotational member having a bore with an inwardly facing bearing surface, and an inner rotating member including an inner portion, and an outwardly facing self-lubricating bearing surface received in the inwardly facing bearing surface of the outer stationary member. The wear life of the bearing assembly is improved because the entire circumference of the self-lubricating bearing surface is load bearing as the bearing surface rotates.

The invention also provides a bearing assembly comprising an outer stationary bearing member having a bore with an inwardly facing cylindrical bearing surface, and an inner rotating assembly including a bearing sleeve having an internal bore, and an outwardly facing self-lubricating cylindrical bearing surface received in the inwardly facing bearing surface of the outer stationary bearing member, and a shaft received in the internal bore of the bearing sleeve and fixed to the bearing sleeve for common rotary movement with the bearing sleeve.

The invention also provides a bearing assembly comprising an outer stationary assembly including a housing having an axial bore with an inwardly facing spherical surface, and an outer bearing member including an outwardly facing spherical surface received in the inwardly facing spherical surface of the housing block and a bore including an inwardly facing cylindrical bearing surface, and an inner rotating assembly including a rotating shaft, and a bearing sleeve fixed to the shaft for common rotation and including an axial bore receiving the shaft, and an outwardly facing composite fabric self-lubricating bearing having an outwardly facing cylindrical bearing surface received in the inwardly facing bearing surface of the outer bearing member.

Other features and advantages of the invention will become apparent to those skilled in the art upon review of the following detailed description, claims, and drawings.

BRIEF DESCRIPTION OF THE DRAWINGS

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

FIG. 1 is an exploded perspective view of a bearing assembly which incorporates various features of the invention.

FIG. 2 is a sectional view of the of the bearing assembly shown in FIG. 1.

FIG. 3 is a sectional view of another embodiment of a bearing assembly incorporating various of the features of the invention.

FIG. 4 is a perspective view of a sleeve employed in an alternate embodiment of the invention.

FIG. 5 is a perspective view of another sleeve employed in another alternate embodiment of the invention.

DESCRIPTION OF THE PREFERRED EMBODIMENT

Shown in FIG. 1 is a bearing assembly 8 including a ball and socket non-rotational or stationary bearing assembly 10 of the type including a non-rotational member or flange block or housing 12, and a bearing subassembly 14 which can be inserted and retained or housed within the housing 12.

The housing 12 comprises a body 16 having an axis 18 and axially spaced sides 22 and 23. Extending between the axially spaced sides 22 is an axially extending bore 24 having an inwardly facing concave or spherical mounting surface or socket 26. The diameter of the mounting socket 26 diminishes in either axial direction from a central maximum diameter to opposed circumferential regions of minimum diameter 30 at the housing sides 22.

The housing 12 also includes insertion slot means extending axially from one of the sides 22 and 23 in the housing 12 and terminating adjacent the central maximum diameter. The insertion slot means preferably comprises two insertion slots 34 which are diametrically spaced apart a distance at least equal to the diameter of the region of maximum diameter in the concave mounting socket 26.

The bearing subassembly 14 generally includes a one piece, integrally formed annular intermediate socket member 40 having a socket axis and axially spaced ends 44 and 46. An axial socket bore extends between the axial ends 44 and 46 and is defined by an inwardly facing, concave inner raceway or bore 50. The concave inner raceway 50 includes a bearing surface, such as a liner of self-lubricating low-friction material, which is integrally bonded to the concave inner raceway 50.

The self-lubricating material can comprise a fabric woven from fibers of self-lubricating material, and if the intermediate socket member 40 is of fiberglass, the material may be bonded to the concave inner raceway 50 by the method disclosed in the U.S. Pat. Nos. 3,700,295 and 3,974,009 referenced above.

A preferred intermediate socket member 40 comprises a hardened resin body reinforced by glass filaments or some other reinforcing filaments which includes the self-lubricating low-friction material lining the concave inner raceway 50.

The intermediate socket member 40 also includes a convex, generally spherical outer surface 54 which is ground or otherwise machined on the outer diameter of the one piece intermediate socket member 40. The convex outer surface 54 has a dimension complementary to the inwardly facing concave mounting socket 26 of the housing 12.

The one piece intermediate socket member 40 also has an installation axis extending transversely to the housing axis 18 and the socket axis. The width across the axially spaced intermediate socket ends 44 and 46 is slightly less than the width of the insertion slots 34, which width permits the one piece intermediate socket member 40 of the subassembly 14 to be inserted into the insertion slots 34 and then turned to seat the convex outer surface 54 of the one piece intermediate socket member 40 in the housing concave mounting socket 26, thereby installing the bearing subassembly 14 within the housing 12.

The bearing subassembly 14 can similarly be removed from the housing 12 by simply turning the intermediate socket member 40 ninety degrees (90°) to align the intermediate socket member 40 with the insertion slots 34 and then sliding the intermediate socket member 40 away from the housing 12 along the housing axis 18.

If relative movement of the convex outer surface 54 and the mounting socket 26 of the housing 12 is contemplated, a layer of self-lubricating material, may be bonded to the convex outer surface 54 of the one piece intermediate socket member 40.

A method for integrally bonding self-lubricating material to an external surface of a substratum to form a self-lubricating surface thereon is disclosed in U.S. Pat. No. 5,288,354, issued Feb. 22, 1994, and titled "METHOD OF BONDING SELF-LUBRICATING FIBERS TO AN EXTERNAL SURFACE OF A SUBSTRATUM".

The bearing subassembly 14 also includes a spherical bearing member or ball 60 which is mounted within the one piece annular intermediate socket member 40 and which can be generally stationary with respect to, or free to move and to rotate within, the intermediate socket member 40.

The outer bearing member or ball member 60 includes flat circular end faces 64 and 65 and is provided with a central bore defined by an inwardly facing bearing surface 62. While other constructions can be employed, in the disclosed construction, the inwardly facing bearing surface 62 is cylindrical.

The outer bearing member or ball member also includes an external spherical bearing surface 68 which is in contact with the concave inner raceway 50 and which can accommodate misalignment or rotation within the intermediate socket member 40. The outer bearing member or ball member 60 can be fabricated of metal, and the external spherical bearing surface 68 of the outer bearing member can be lined with self-lubricating material integrally bonded to the metal by the method described above for applying self-lubricating material to the convex outer surface 54.

Alternatively, the outer bearing or ball member 60 can be fabricated from a fiberglass material.

After the intermediate socket member 40 has been placed into the insertion slots 34 and turned to the housing bore 24 ninety degrees (90°), the intermediate socket member 40 is sandwiched between the spherical outer bearing member or ball member 60 and the housing 12 and the bearing subassembly 14 and is ready to support a load.

Located in the bore of the outer bearing member or ball member 60 is an inner rotating member or shaft or shaft assembly which can be a shaft having thereon an external bearing surface of self-lubricating material (not shown), or which can be an inner rotating assembly including a shaft and an outer bearing sleeve having common rotation with the shaft and an external bearing surface of self-lubricating material.

More particularly, and as shown in the drawings, the bearing assembly 10 preferably includes an inner rotating assembly 71 which is located in the inwardly facing bearing surface or bore 62 of the outer bearing member or ball member 60 and includes the before mentioned shaft or inner part 73 and the before mentioned outer bearing part or bearing sleeve 75 which surrounds the shaft 73 for common rotation therewith and which includes the before mentioned outer or external bearing surface 77 of self-lubricating material.

The inner rotatable shaft 73 can be of any suitable construction and is illustrated as having at least a portion with a hexagonal cross-section.

The outer bearing part or bearing sleeve 75 includes a main body 81 having a bore 83 receiving the shaft 73 so as to have common rotation with the shaft 73. In addition, the outer bearing part or bearing sleeve 75 includes a bearing portion having the outwardly facing, self-lubricating bearing surface 77 received in and engaging the inwardly facing bearing surface 62 of the outer bearing member or ball member 60. While other constructions can be employed, in the disclosed construction, the outwardly facing bearing surface 77 is cylindrical.

The bearing sleeve 75 can be fabricated in one piece from a woven fabric and resinous composite material which is self-lubricating. Alternately, the main body 81 can be fabricated of metal having an outer surface provided with a layer of self-lubricating material which is bonded to the outer surface of the main body 81 and provides the bearing surface 77. Preferably, the self-lubricating material is a composite material including woven self-lubricating fabric and resin.

Any suitable arrangement can be employed for fixing the inner shaft 73 and the outer bearing sleeve 75 to each other for common movement. In one arrangement, the bore 83 of the main body 81 has a non-circular shape or configuration, and the shaft 73 has a complimentary outer surface portion 91 engaged in the non-circular bore 83 to prevent rotary movement therebetween. In the embodiment shown in FIGS. 1 and 2, the non circular shape is hexagonal. In another embodiment shown in Figure, the non-circular shape is square. Other non-circular shapes can also be used.

In still another embodiment shown in FIG. 5, the bore 83 of the bearing sleeve 75 is cylindrical and the shaft 73 can be pressed fitted into the bore 83.

When the bearing assembly 10 is subject to heavy loading, the inwardly facing bearing surface 62 of the outer bearing member or ball member 60 is preferably metallic. When the bearing assembly 10 is subject to relatively light loading, the inwardly facing bearing surface 62 of the outer bearing member or ball member 60 can be of self-lubricating material, such as the before mentioned composite material including woven fabric and resin.

The disclosed construction provides an improved bearing assembly 8 with increased useful life by placing the self-lubricating bearing surface 77 on a rotating shaft or sleeve member. When applying the woven fabric in this manner, the full circumferential extent of the self-lubricating bearing surface 77 is exposed to the load as the bearing rotates.

As explained above, the preferred construction comprises the bearing sleeve 75 having the external, outwardly facing cylindrical, self-lubricating bearing surface 77, and the inner bore 83 which can be cylindrical, hexagonal, or square, etc., and which receives, and is fixed for common rotation to, the rotating shaft 73.

If desired, the bearing subassembly 14 can be fabricated as a single composite member including the outwardly facing convex outer surface 54 and the inwardly facing bearing surface 62.

The inwardly facing bearing surface 62 of the outer bearing member 60 (engaged by the outwardly facing bearing surface 77 of the sleeve member 75) can be (as shown in FIG. 2) a metallic bearing surface 91 or, if light loads are involved, can be (as shown in FIG. 3) a self-lubricating bearing surface or layer 93. The metallic bearing surface 91 can be press fitted into a suitable housing which, in the disclosed construction, is the ball member 60. The inwardly facing metallic bearing surface 91 acts to transfer heat, thereby enabling increased operating velocity by providing a better heat sink. In addition, in the disclosed construction, wear occurs about the entire arcuate length of the self-lubricating bearing surface 77.

As already mentioned, for light loads, the outwardly facing, cylindrical self-lubricating bearing surface 77 of the sleeve member 75 can rotate against the inwardly facing self-lubricating bearing surface 93 of the outer bearing or ball member 60 to provide superior corrosion resistance.

The disclosed construction, wherein the self-lubricating outer cylindrical bearing surface or layer 77 of the inner bearing member or bearing sleeve 75 runs on the inwardly facing cylindrical metallic bearing surface 91 of the outer bearing member or ball member 60, outperforms, i.e., enjoys longer life, when operated under the same speed and load conditions, as compared to the above described prior constructions wherein the outwardly facing cylindrical metallic surface of a shaft ran on an inwardly facing self-lubricating bearing surface of a ball member.

For light load applications, the inner bearing member or sleeve member 75 (with an outer layer of self lubricating material providing the continuous external bearing surface 77) can run on the outer bearing member or ball member 60 (having an inner bore lined with self-fabricating material to provide the self-lubricating bearing surface or layer 93) and still provide adequate bearing life.

Various of the features of the invention are set forth in the following claims.

We claim:

1. A bearing assembly comprising an outer stationary assembly including a housing having an axial bore with an inwardly facing spherical surface, an outer bearing member including an outwardly facing spherical surface which is fabricated of self-lubricating material and which is received in said inwardly facing spherical surface of said housing and a bore including an inwardly facing cylindrical bearing surface, and an inner rotating assembly including a rotating shaft, and a bearing sleeve fixed to said shaft for common rotation and including an axial bore receiving said shaft, and an outwardly facing composite fabric self-lubricating bearing having an outwardly facing cylindrical bearing surface received in said inwardly facing bearing surface of said outer bearing member.

2. A bearing assembly in accordance with claim 1 wherein said bore of said sleeve has an hexagonal cross-section.

3. A bearing assembly in accordance with claim 1 wherein said bore of said sleeve has a non-cylindrical cross-section.

4. A bearing assembly in accordance with claim 1 wherein said bore of said sleeve has a cylindrical cross-section.

5. A bearing assembly in accordance with claim 1 wherein said bore of said sleeve has a square cross-section.

6. A bearing assembly in accordance with claim 1 wherein said inwardly facing bearing surface of said outer bearing member is metallic.

7. A bearing assembly in accordance with claim 1 wherein said inwardly facing bearing surface of said outer bearing member is fabricated of self-lubricating non-metallic material.

8. A bearing assembly in accordance with claim 1 wherein said outer composite fabric bearing part includes a woven fabric.

9. A bearing assembly in accordance with claim 1 wherein said outwardly facing bearing surface is annular and extends endlessly.

* * * * *